US012333900B2

(12) United States Patent
Haishima

(10) Patent No.: US 12,333,900 B2
(45) Date of Patent: Jun. 17, 2025

(54) INFORMATION PROCESSING DEVICE AND PAYOUT MANAGEMENT SYSTEM

(71) Applicant: Universal Entertainment Corporation, Tokyo (JP)

(72) Inventor: Jun Haishima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 466 days.

(21) Appl. No.: 17/597,554

(22) PCT Filed: Jun. 22, 2020

(86) PCT No.: PCT/JP2020/024294
§ 371 (c)(1),
(2) Date: Jan. 11, 2022

(87) PCT Pub. No.: WO2021/010091
PCT Pub. Date: Jan. 21, 2021

(65) Prior Publication Data

US 2022/0245998 A1 Aug. 4, 2022

(30) Foreign Application Priority Data

Jul. 12, 2019 (JP) ................................ 2019-130356

(51) Int. Cl.
*G07F 17/32* (2006.01)

(52) U.S. Cl.
CPC ...... *G07F 17/3244* (2013.01); *G07F 17/3248* (2013.01); *G07F 17/3251* (2013.01); *G07F 17/3255* (2013.01)

(58) Field of Classification Search
CPC ............. G07F 17/3244; G07F 17/3248; G07F 17/3251; G07F 17/3255
See application file for complete search history.

(56) References Cited

U.S. PATENT DOCUMENTS 5,709,603 A 1/1998 Kaye
6,168,522 B1 * 1/2001 Walker ................ G07F 17/3244 463/20

(Continued)

FOREIGN PATENT DOCUMENTS

JP 2015083119 A 4/2015
JP 2016214396 A 12/2016

(Continued)

*Primary Examiner* — Steven J Hylinski
(74) *Attorney, Agent, or Firm* — Simpson & Simpson, PLLC; S. Peter Konzel

(57) ABSTRACT

An object of the present invention is to provide an information processing device and a payout management system capable of improving casino sales by reducing the number of attendants staying on a casino floor while ensuring legitimacy of a hand pay and by preventing an operation of a gaming machine from being interrupted.
When condition (a hand pay) satisfaction information indicating that a predetermined condition (a generation condition of the hand pay) for granting the prize to a player separately from a process of the gaming machine is satisfied is received from the gaming machine, and then erasure information indicating erasure of balance information of the game value stored in the gaming machine is received from the gaming machine, the balance information of the game value is transmitted to an outside.

9 Claims, 9 Drawing Sheets

(56) References Cited

U.S. PATENT DOCUMENTS

| | | | | |
|---|---|---|---|---|
| 6,312,333 | B1 * | 11/2001 | Acres | G07F 17/32 463/28 |
| 7,147,558 | B2 * | 12/2006 | Giobbi | G07F 17/3251 463/25 |
| 8,137,182 | B2 * | 3/2012 | Kearns | G07F 17/3213 463/31 |
| 2002/0045476 | A1 * | 4/2002 | Poole | G07F 17/32 463/25 |
| 2002/0058550 | A1 * | 5/2002 | Pace | G06Q 10/109 463/42 |
| 2002/0177479 | A1 * | 11/2002 | Walker | G07F 17/3248 463/25 |
| 2003/0199320 | A1 * | 10/2003 | Nguyen | G07F 17/3262 463/42 |
| 2004/0204233 | A1 * | 10/2004 | Saffari | G07F 17/32 463/25 |
| 2010/0124983 | A1 * | 5/2010 | Gowin | G07F 17/3223 463/40 |
| 2012/0115571 | A1 | 5/2012 | Kitamura et al. | |
| 2015/0080104 | A1 | 3/2015 | Nakamura et al. | |
| 2016/0335854 | A1 | 11/2016 | Kitamura et al. | |
| 2019/0051117 | A1 * | 2/2019 | Acres | G07F 17/3286 |
| 2019/0139356 | A1 | 5/2019 | Moya Garcia | |

FOREIGN PATENT DOCUMENTS

| | | | | | |
|---|---|---|---|---|---|
| JP | 2019506995 | A | | 3/2019 | |
| WO | WO-0132281 | A1 | * | 5/2001 | A63F 3/081 |

* cited by examiner

INFORMATION PROCESSING DEVICE AND PAYOUT MANAGEMENT SYSTEM

TECHNICAL FIELD

The present invention relates to an information processing device and a payout management system for granting a prize to a player from a gaming machine in a casino or the like in which the gaming machine such as a slot machine or the like is installed.

BACKGROUND ART

Related art discloses a gaming machine such as a slot machine or the like that displays a plurality of symbols in a stopped state after displaying the plurality of symbols in a scrolled manner, and provides a game value based on a combination of the symbols displayed in the stopped state.

In game facilities such as a casino or the like in which a plurality of gaming machines are installed, a player can play a game by inserting cash into the gaming machine or by inserting a pre-registered member card thereinto.

When the player is granted a prize as a result of the game, a method for causing a member card being inserted into the gaming machine to be associated with a prize amount and discharging the member card therefrom, and a method for outputting a sheet on which a payout amount is printed by a barcode or the like from a ticket printer installed in the gaming machine are adopted (refer to Patent Literature 1).

Meanwhile, in a gaming machine of related art, when a winning that provides a prize exceeding a preset maximum amount occurs, a player calls an attendant and then the attendant determines a content of the prize and legitimacy thereof by confirming a winning state of the gaming machine (for example, a combination of symbols of reels displayed in a stopped state).

When the legitimacy thereof is confirmed, the attendant issues a slip, obtains approval of an administrator, converts the slip into cash at a cash payment office referred to as a so-called cage, hands the cash over to the player, and performs an operation of cancelling a credit of the gaming machine.

In this manner, with respect to the payment of a prize exceeding a predetermined amount, the prize amount is paid to the player by a payout method referred to as a so-called hand pay via the attendant.

In addition to the generation of the prize exceeding the predetermined amount, even when a problem occurs in a gaming machine, cash payment via a credit cancellation operation and issuance of a slip by an attendant is performed.

CITATION LIST

Patent Literature

PTL 1: US-A-2012-0115571

SUMMARY OF INVENTION

Technical Problem

In an operation of such a gaming machine in related art, generation of a prize exceeding a predetermined amount and occurrence of a trouble in the gaming machine can occur irregularly and accidentally, such that it is required to smoothly execute a process of a hand pay and thus it is also required to allow a certain number of attendants to stay at a casino. Since it is required to suspend the operation of the gaming machine while the attendant determines the legitimacy, an operation rate of the gaming machine deteriorates.

The present invention is made in consideration of the above-described points, and an object thereof is to provide an information processing device and a payout management system capable of improving casino sales by reducing the number of attendants staying on a casino floor while ensuring legitimacy of a hand pay and by preventing an operation of a gaming machine from being interrupted.

Solution to Problems

An information processing device of the present invention is an information processing device connected to a gaming machine that can play a game according to an input game value, grant a player a prize according to a result of the game, and store a balance of the game value, and capable of transmitting information on the gaming machine to an outside, the device including:

an interface that is capable of receiving the information from the gaming machine; and an information processing unit that is configured to be able to transmit balance information of the game value to the outside, in which when receiving, from the gaming machine, condition satisfaction information indicating that a predetermined condition for granting the prize to the player separately from a process of the gaming machine is satisfied, and receiving, from the gaming machine, erasure information indicating erasure of the balance information of the game value stored in the gaming machine, the information processing unit transmits the balance information of the game value to the outside.

According to this configuration, the balance information can be transmitted to the outside, such that legitimacy of the balance information can be determined at the outside. Accordingly, while ensuring legitimacy of a hand pay in which a prize is granted separately from the process of the gaming machine, it is possible to reduce the number of attendants staying on a casino floor and prevent an operation of the gaming machine from being interrupted.

When receiving, from the gaming machine, the condition satisfaction information indicating that the predetermined condition for granting the prize separately from the process of the gaming machine is satisfied, and receiving, from the gaming machine, the erasure information indicating the erasure of the balance information stored in the gaming machine, this configuration transmits the balance information of the game value to the outside, such that the balance information is configured to be transmitted to the outside based on the satisfaction of the two conditions which are the satisfaction of the predetermined condition and the erasure information of the balance information. That is, when the predetermined condition for granting the prize separately from the process of the gaming machine is satisfied and the erasure information indicating the erasure of the balance information stored in the gaming machine is received from the gaming machine, the balance information of the gaming machine is configured to be transmitted to the outside, such that, for example, the balance information is not transmitted to the outside only when the predetermined condition is satisfied, and the erasure of the balance information of the gaming machine is correlated with the transmission of the balance information. Accordingly, it is possible to avoid a discrepancy between the balance in the gaming machine and the balance transmitted to the outside.

The information processing device of the present invention according to the configuration further includes an information medium interface that receives an information media associated with specific information that specifies a player playing a game on the gaming machine, in which the information processing unit transmits the balance information to an account corresponding to the player specified via the received information medium.

According to this configuration, the balance information of the game value can be associated with a player, such that payout can be made to the player by using data referred to as the balance information instead of a case of related art in which an attendant hands cash over to the player. Accordingly, a hand pay process can be smoothly performed.

According to this configuration, processing time can be shortened as compared with a case in which payout to a player is made in cash.

According to this configuration, since cash payments and receipts are eliminated, it is possible to prevent occurrence of a human error related to cash handling.

According to this configuration, it is possible to prevent a fraudulent behavior by an attendant when the attendant hands cash over to a player.

According to this configuration, it is possible to avoid a troublesome labor that a player manually counts cash.

A payout management system of the present invention includes:

an information processing device that is connected to a gaming machine capable of playing a game according to an input game value and capable of storing a balance of the game value, and that can transmit information on the gaming machine to an outside; and an information medium interface that receives an information medium associated with specific information that specifies a player playing a game on the gaming machine, in which when receiving, from the gaming machine, condition satisfaction information indicating that a predetermined condition for granting the prize to the player separately from a process of the gaming machine is satisfied, and receiving, from the gaming machine, erasure information indicating erasure of balance information of the game value stored in the gaming machine, the information processing device transmits the balance information of the game value to an account corresponding to the player specified via the information medium received by the information medium interface.

According to this configuration, the balance information of the game value can be associated with a player, such that payout can be made to the player by using data referred to as the balance information instead of a case of related art in which an attendant hands cash over to the player. Accordingly, a hand pay process can be smoothly performed.

According to this configuration, processing time can be shortened as compared with a case in which payout to a player is made in cash.

According to this configuration, since cash payments and receipts are eliminated, it is possible to prevent occurrence of a human error related to cash handling.

According to this configuration, it is possible to prevent a fraudulent behavior by an attendant when the attendant hands cash over to a player.

According to this configuration, it is possible to avoid a troublesome labor that a player manually counts cash.

A payout management system of the present invention includes:

an information processing device that is connected to a gaming machine capable of playing a game according to an input game value and capable of storing a balance of the game value, and that can transmit information on the gaming machine to an outside; and an external terminal device that is capable of transmitting and receiving information to and from the information processing device, in which the information processing device includes an erasure information transmission unit that transmits balance information of the game value to the outside when receiving, from the gaming machine, erasure information indicating erasure of the balance information of the game value stored in the gaming machine, the external terminal device urges a player of the gaming machine to input confirmation in association with the transmission of the balance information from the information processing device, and transmits an association instruction signal instructing association between the balance information transmitted to the outside and the player in response to the confirmation input by the player.

According to this configuration, the balance information transmitted from the gaming machine is associated with a player on the condition that the player inputs confirmation such as an electronic signature or the like, such that legitimacy can be given to the balance information transmitted as data.

According to the configuration, in the payout management system of the present invention, the erasure information transmission unit transmits the balance information of the game value in association with the player of the gaming machine.

According to this configuration, the balance information of the game value can be associated with a player, such that payout can be made to the player by using data referred to as the balance information instead of a case of related art in which an attendant hands cash over to the player. Accordingly, a hand pay process can be smoothly performed.

According to the above-described configuration, in the payout management system of the present invention, the external terminal device is a portable communication medium.

According to this configuration, by using an external terminal device as a portable communication medium, an attendant can urge a player to input confirmation by moving to a place where the player is with the external terminal device. Accordingly, it is possible to avoid a labor in which the player moves from the gaming machine to the external terminal device and inputs the confirmation. Accordingly, an operation rate of the gaming machine can be improved.

Advantageous Effects of Invention

According to the present invention, it is possible to provide an information processing device and a payout management system capable of improving casino sales by reducing the number of attendants staying on a casino floor and preventing an operation of a gaming machine from being interrupted.

DESCRIPTION OF EMBODIMENTS

[Overall Configuration]

Figure 1:
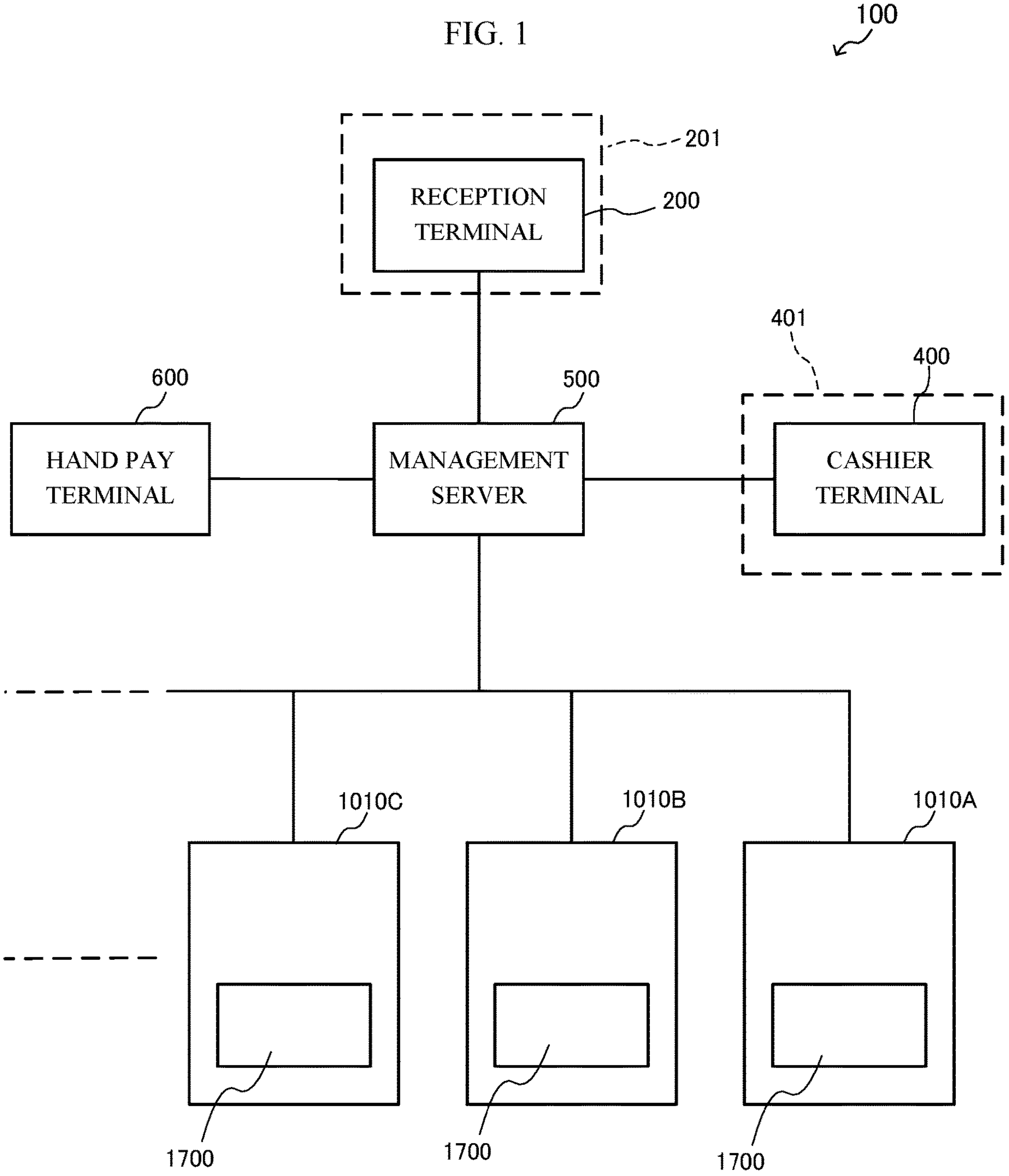
FIG. 1 is a diagram illustrating an overall configuration of a casino system and a configuration of a management server according to an embodiment of the present invention.

FIG. 1 is a block diagram illustrating a casino system 100 including a payout management system according to an embodiment of the present invention. As illustrated in FIG. 1, the casino system 100 includes, for example, a plurality of gaming machines installed in a game facility such as a casino or the like (for example, slot machines 1010A, 1010B, . . . ) and a management server 500 connected thereto such that communication therebetween can be bidirectionally performed.

A reception terminal device 200 provided at a reception counter 201 is connected to the management server 500, and a membership number is registered in a database of the management server 500 via the reception terminal device 200, such that a member account corresponding to the membership number can be opened on the database. At the reception counter 201, the membership number registered in the management server 500 is stored in a newly issued member information card (an IC card 1500) and the member information card is handed over to a player registered as a member. When member registration is performed, a player who intends to be registered as a member fills out member information (for example, a name, an address, a telephone number, a nationality, a passport number, personal identification information that is issued by a government or the like and identifies an individual, and bank account information of a member and its password as necessary) on a predetermined form at the reception counter 201 and submits the predetermined form thereat. An attendant at the reception counter 201 registers a content described in the submitted form in the database of the management server 500 by inputting the content together with the newly issued membership number via the reception terminal device 200. Accordingly, the input member information is registered in the database thereof in association with the membership number.

Credit data stored in the member account is used when the member plays a game on the slot machines 1010A, 1010B, . . . (hereinafter, simply referred to as a slot machine 1010), and credit data of an amount corresponding to a prize generated in the slot machine 1010 as a result of the game is configured to be added to credit data of a corresponding member account on the database. As a method for inputting the credit data to the member account, in addition to an input method in which cash is paid at the reception counter 201 and a reception attendant operates the reception terminal device 200 to input the cash, it is also possible to use an input method associated with a credit card of a bank, that is, a method for transmitting cash data from a bank account of the member to the member account of the management server 500. The slot machine 1010 includes a cash input unit, and a player can also play a game by directly inserting cash into the slot machine 1010.

In this manner, the IC card 1500 (the member information card) provided with the membership number is issued at the reception counter 201, and is used when a player registered as a member plays a game on the slot machine 1010. In the database of the management server 500, the credit data is stored in association with the membership number (and a card number), and the IC card 1500 (the member information card and a non-member information card) also stores data representing a credit balance of the member (a non-member). The credit data stored on the IC card 1500 side is backup data used in an emergency such as when a system failure occurs.

The management server 500 is connected to a cashier terminal device 400 of a cashier 401 referred to as a cage for performing cash conversion based on the IC card 1500 (the member information card and the non-member information card). When a player who plays a game by using the IC card 1500 as the member information card ends the game, information such as a credit balance of a member account specified by the IC card 1500 is updated by a game termination process executed in the slot machine 1010.

Accordingly, after the game termination process is performed in the slot machine 1010, the player inserts the IC card 1500 into a card reading device of the cashier terminal device 400, such that a balance of the member account of the player associated with the membership number stored in the IC card 1500 is paid out to the member player.

In the slot machine 1010 (a slot machine interface board (SMIB) device 1700), an amount of a prize generated when a game is played by directly inserting cash without using the IC card 1500 and a remaining balance after a BET are associated with the card number of the new IC card 1500 (the non-member information card) stocked in advance in the slot machine 1010 (the SMIB device 1700), thereby issuing the IC card 1500.

When the non-member information card is issued in the slot machine 1010, the SMIB device 1700 of the slot machine 1010 transmits, to the management server 500, a fact that the non-member information card is issued together with the card number of the non-member information card (the IC card 1500) to be issued. By receiving these pieces of information, the management server 500 opens a non-member account associated with the card number on the database of the management server 500. Prize money given to a player as a result of the game in the slot machine 1010 and a remaining amount of an input amount after a BET are stored in the non-member account on the management server 500 opened in association with the card number of the non-member information card to be newly issued, and are also stored in the non-member information card to be issued for backup. The player inserts the non-member information card (the IC card 1500) newly issued in the slot machine 1010 (for example, the slot machine 1010A in FIG. 1) to other slot machines (the slot machines 1010B, 1010C, . . . in FIG. 1), and uses the number of credits corresponding to balance information associated with the non-member information card in the management server 500 and stored in the non-member information card for backup, thereby making it possible to play a new game.

A hand pay terminal device 600 is connected to the management server 500. The hand pay terminal device 600 is a terminal operated by an attendant during a hand pay process which will be described later. In the slot machine 1010, when a prize exceeding a preset amount is generated and when a device malfunction occurs, a player calls an attendant to perform a hand pay process.

Specifically, for example, when a prize exceeding a preset amount is generated as a result of a game executed in the slot machine 1010, a display showing the generation of the prize and urging a player to call an attendant is performed on a display unit (described later) of the slot machine 1010.

Figure 3:
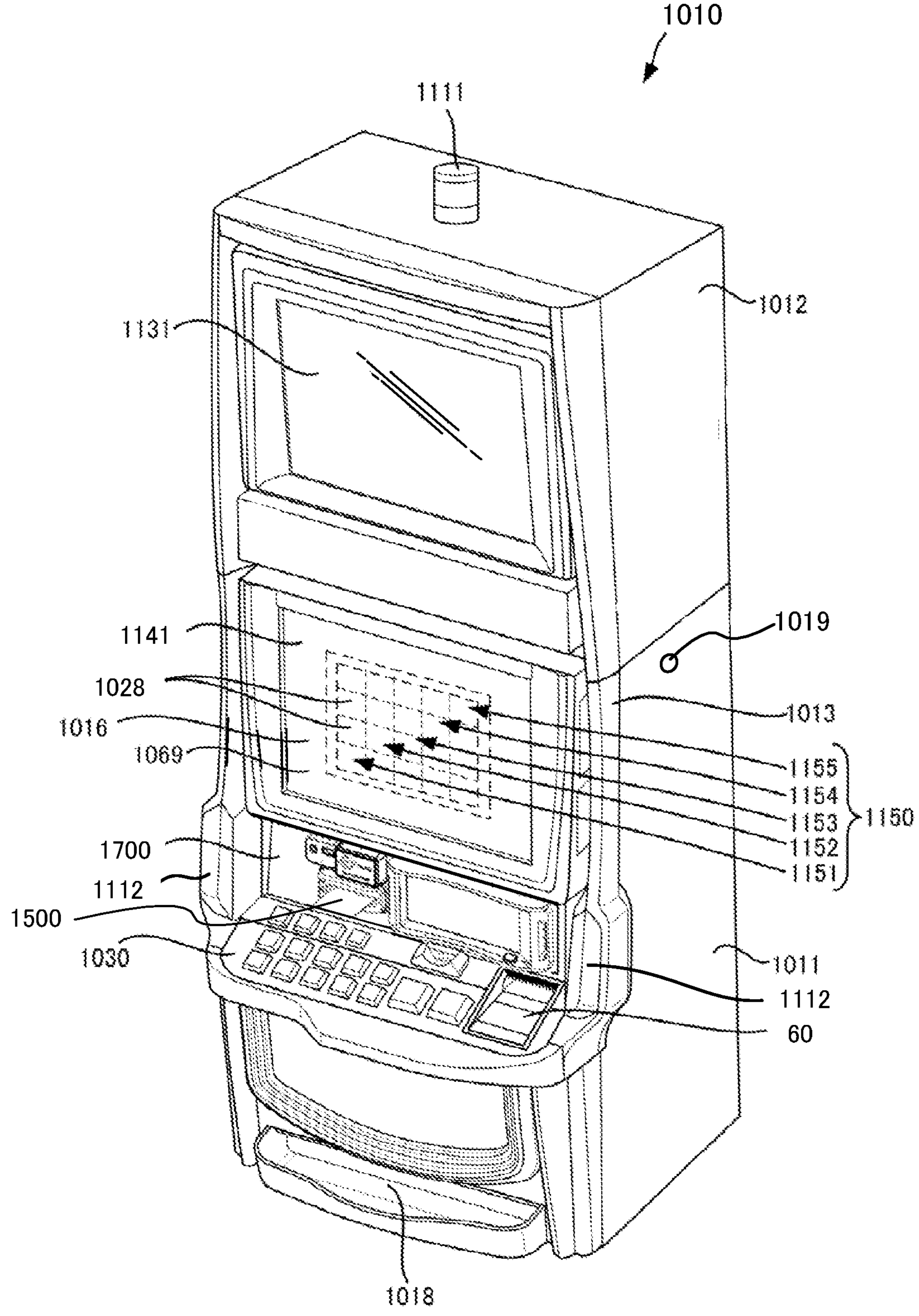
FIG. 3 is a perspective view illustrating a configuration of a slot machine according to an embodiment of the present invention.

When a player operates a call button 1739 (FIGS. 4 and 6) provided in the SMIB device 1700 to call an attendant, the attendant operates a reset key switch 1019 (FIG. 3) provided in the slot machine 1010 by using a predetermined key, such that the credit data (the balance information) of the player stored in the slot machine 1010 is transmitted to the management server 500 and added to an account of the player. Details of the hand pay process will be described later.

Figure 2:
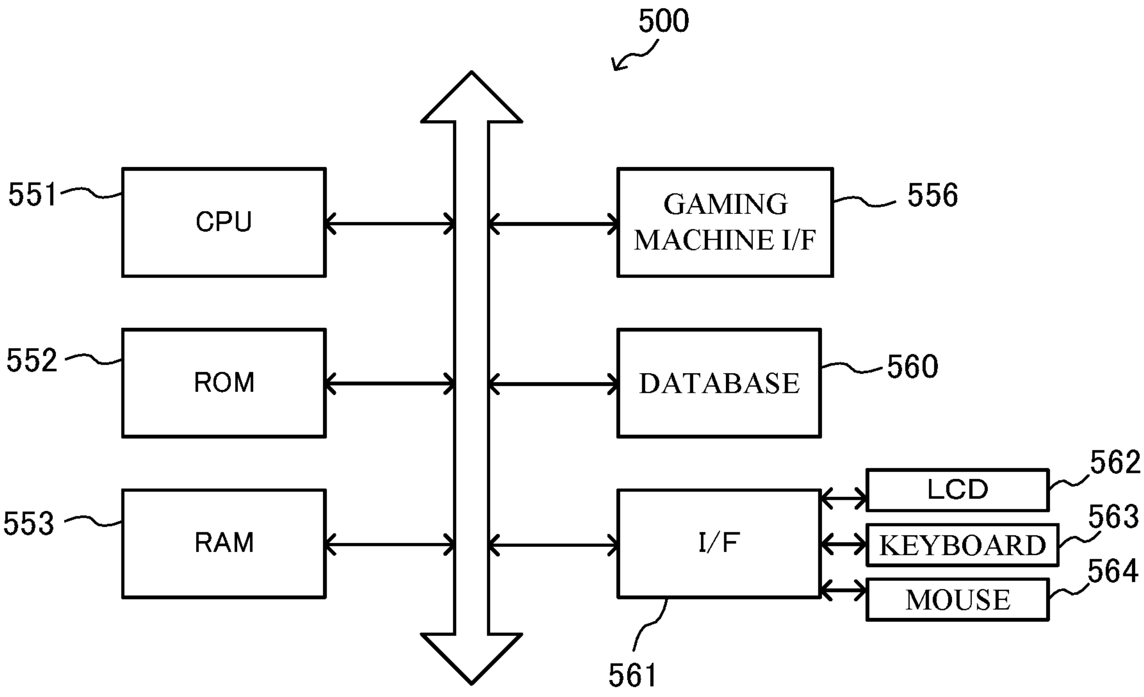
FIG. 2 is a block diagram illustrating a configuration of a management server of the casino system according to the embodiment of the present invention.

FIG. 2 is a block diagram illustrating a configuration of the management server 500. As illustrated in FIG. 2, in the management server 500, a central processing unit (CPU) 551, a read only memory (ROM) 552, a random access memory (RAM) 553, a gaming machine I/F 556, a database 560, and an I/F 561 are configured to be connected to a bus, and a liquid crystal display (LCD) 562, a keyboard 563, and a mouse 564 are configured to be connected thereto via the I/F 561. The database 560 stores an information card number of a member information card, a membership number of a member, member information, balance information (credit data) and game history information associated with the member information card, an information card number of a non-member information card issued to a non-member, and balance information (credit data) and game history information associated with the information card number.

[Overall Configuration of Slot Machine]

Next, an overall configuration of the slot machines 1010A, 1010B, . . . (hereinafter referred to as the slot machine 1010) will be described with reference to FIG. 3.

In the slot machine 1010, a member information card (the IC card 1500), a non-member information card (the IC card 1500), a banknote, or electronic valuable information equivalent to these game values are used as a game medium. Particularly, in the embodiment, credit-related data such as cash data or the like stored in the member information card or the non-member information card (hereinafter, referred to as the IC card 1500) is used.

The slot machine 1010 includes a cabinet 1011, a top box 1012 installed on an upper side of the cabinet 1011, a main door 1013 provided on a front surface of the cabinet 1011.

The main door 1013 includes a symbol display device 1016 referred to as a lower image display panel 1141. The symbol display device 1016 is formed of a transparent liquid crystal panel. A screen displayed by the symbol display device 1016 includes a display window 1150 in the center thereof. The display window 1150 is formed of 20 pieces of display blocks 1028 in five columns and four rows. The four pieces of display blocks 1028 in each column form pseudo reels 1151 to 1155 and are configured to be rotated in response to an operation of a player. Each of the pseudo reels 1151 to 1155 can be rearranged in such a manner that the four pieces of display blocks 1028 are moved and displayed in a downward direction while changing a speed as a whole such that a symbol displayed on each of the display blocks 1028 is rotated in a vertical direction and then is stopped.

Here, the "rearrangement" indicates a state in which the symbols are arranged again after arrangement of the symbols is released. The "arrangement" indicates that the symbols are in a state of being visually confirmable by a player outside. The slot machine 1010 executes a so-called slot game in which a dividend corresponding to a winning combination is provided depending on the arrangement state of the symbols based upon the stop state of the rotating pseudo reels 1151 to 1155.

The embodiment describes a case in which the slot machine 1010 is a so-called video slot machine, and the slot machine 1010 of the present invention may adopt a so-called mechanical reel, or some of the pseudo reels 1151 to 1155 may be replaced by the mechanical reel.

A touch panel 1069 is provided on a front surface of the symbol display device 1016, and a player can input various instructions by operating the touch panel 1069. An input signal is transmitted from the touch panel 1069 to a main CPU 1071.

An upper image display panel 1131 is provided on a front surface of the top box 1012. The upper image display panel 1131 is formed of a liquid crystal panel and forms a display. The upper image display panel 1131 displays an image related to a performance, and an image indicating an introduction of a content of a game and a description of a rule thereof. The top box 1012 is provided with a lamp 1111.

A number-of-credits display unit (not illustrated) is displayed at an upper part of the display window 1150, and the current number of credits is displayed thereon. Here, the "credit" is a virtual game medium on a game used when a player makes a BET. A total number of credits currently owned by the player is configured to be displayed on the number-of-credits display unit.

A fractional cash display unit (not illustrated) is displayed at a lower part of the number-of-credits display unit. The fractional cash display unit displays fractional cash. The "fractional cash" indicates cash that is not converted into credit because an inserted amount of money is not sufficient.

A reset key switch 1019 is provided on a side surface of the cabinet 1011. A predetermined key is inserted into the reset key switch 1019 and the predetermined key is turned, such that the reset key switch 1019 can cause a game controller 70 to output an operation signal of the reset key switch 1019.

The IC card 1500 is inserted into the SMIB device 1700 which will be described later, and the number of credits stored in the IC card 1500 is displayed on the number-of-credits display unit. These numerical values are stored in the management server 500 in association with an identification code of the member card.

The SMIB device 1700 is incorporated in the cabinet 1011 at a lower part of the lower image display panel 1141. Speakers 1112 are respectively provided on the left and right sides of the SMIB device 1700, and the lamp 1111 is provided on an upper part of the top box 1012. In the slot machine 1010, performance of a unit game is executed by displaying an image on the upper image display panel 1131, outputting a sound by the speaker 1112, outputting light by the lamp 1111, or the like. The SMIB device 1700 is provided incidentally or inherently in the slot machine 1010. A control panel 1030 including various operation buttons operated by the player is provided at a lower part of the SMIB device 1700.

[Configuration of SMIB Device]

Figure 4:
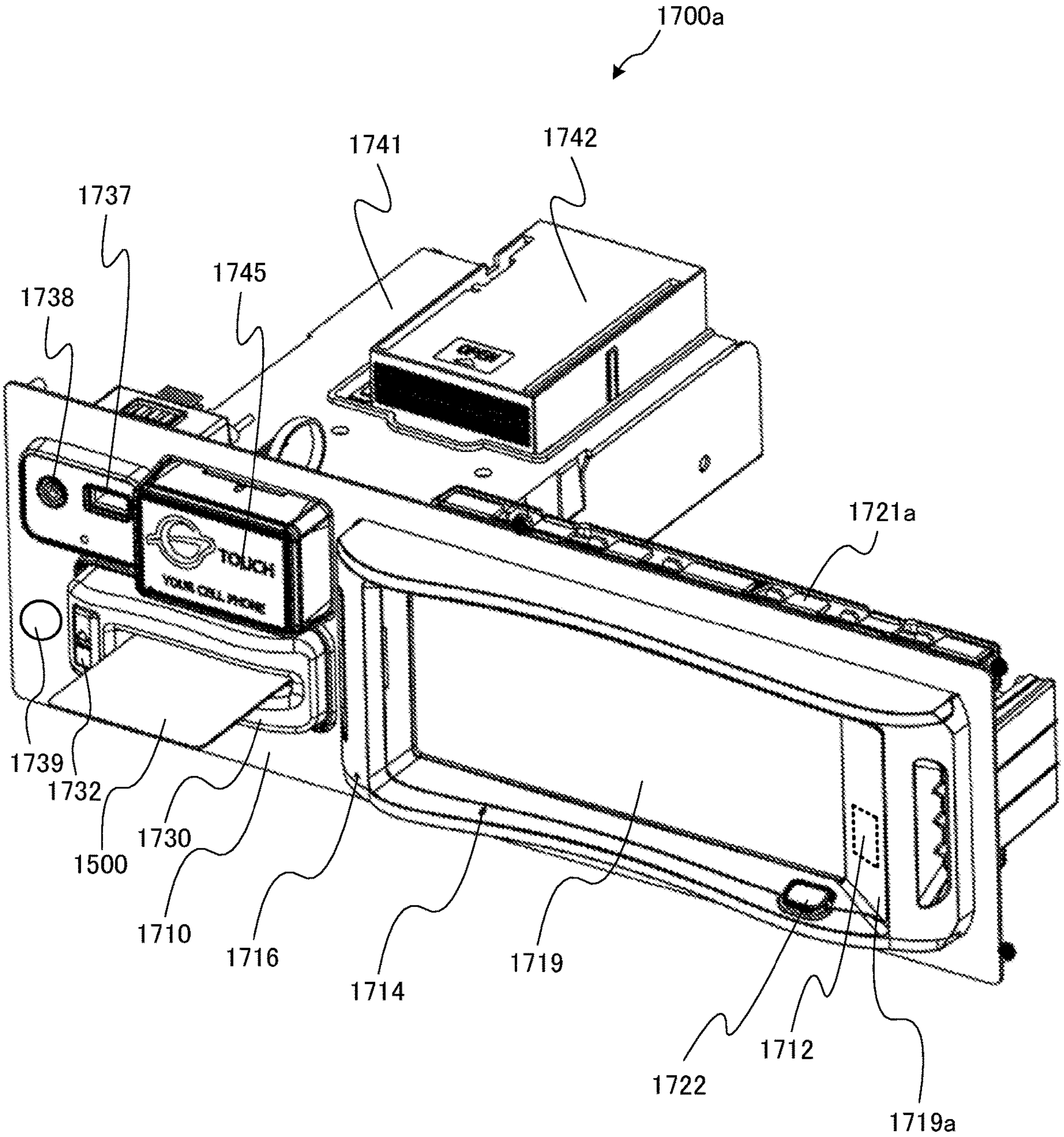
FIG. 4 is a perspective view illustrating an SMIB device (an information processing device) incorporated in the slot machine according to the embodiment of the present invention.

FIG. 4 is a diagram illustrating a structural unit 1770*a* including an LCD 1719 provided on a surface of a panel 1710, a card unit 1741 provided on a back side of the panel 1710, or the like in the SMIB device 1700 (FIG. 3) incorporated in the slot machine 1010. The SMIB device 1700 can be incorporated into various types of gaming machines from various manufacturers by performing data exchange between gaming machines by using a common data interface.

The SMIB device 1700 includes the panel 1710, each unit disposed on a front surface of the panel 1710 is visually recognized by a player, and a member disposed on a back surface of the panel 1710 is housed inside the slot machine 1010 such that the member cannot be seen by the player.

The LCD 1719 having a touch panel function is provided on a right side of the front surface of the panel 1710. The LCD 1719 displays, for example, information on the member and information for the member, and a screen size is 6.2 inches (about 15.7 cm). An LCD cover 1719*a* is provided around a periphery of the LCD 1719. In this example, the LCD 1719 is configured to have the touch panel function, and an instruction of the player may be input by another input device such as a keyboard and a mouse.

A full color LED 1721*a* and a full color LED 1721*b* (FIG. 6) are configured to be capable of performing light emission contributing to a warning of a fraudulent behavior.

An image capturing window 1712 is provided on a right side of the LCD 1719, and a human body detection camera disposed inside the LCD cover 1719*a* captures an image of the player or the like through the image capturing window 1712. The image capturing window 1712 may be, for example, a half mirror material to which a shield process such as smoke or the like is applied.

A card insertion slot 1730 into and from which the IC card 1500 can be inserted and removed is provided at a lower left side of the front surface of the panel 1710. A card insertion unit of the card insertion slot 1730 is provided with a full color LED 1731 (refer to FIG. 5), and it is possible to notify the remaining number of IC cards 1500 collected and stacked in a card stacker 1742 which will be described later by lighting the full color LED 1731 with a plurality of colors. The card insertion slot 1730 includes an eject button 1732, and a red LED 1733 (refer to FIG. 5) provided near the eject button 1732 is configured to be turned on so that a position of the eject button 1732 and a process of an eject operation can be understood.

The card unit 1741 and the card stacker 1742 are provided at a position on the back side of the panel 1710 corresponding to the card insertion slot 1730, and the card insertion slot 1730 is configured as a part of the card unit 1741. About 30 pieces of IC cards 1500 can be stored in the card stacker 1742, and when a non-member player who newly plays a unit game performs settlement of a credit, the IC card 1500 stored in the card stacker 1742 is taken out and discharged to the card insertion slot 1730 as a non-member information card. That is, when the game is played with a currency inserted into a bill entry 60 without inserting the IC card 1500 from the card insertion slot 1730, the IC card 1500 is discharged from the card insertion slot 1730 as the non-member information card in a state of being not associated with personal information of a member database.

On the other hand, when the member information card (the IC card 1500) associated with the personal information of the player in advance is inserted into the card insertion slot 1730, or when the non-member information card (the IC card 1500) that is not associated with the personal information is inserted into the card insertion slot 1730, the inserted IC card 1500 is retained in the card unit 1741, and information such as balance information which is a result of the game in the slot machine 1010 is written to the IC card 1500 retained therein when the card is discharged.

The member information card or the non-member information card (the IC card 1500) retained in the card unit 1741 updates credit information (storage information in first to fourth storage areas) by NFC or the like at the time of the settlement of the credit when a CASHOUT button is operated, and then the IC card 1500 is discharged from the card insertion slot 1730. The IC card 1500 is completely stored inside the card unit 1741 while the player plays the unit game.

When absence of the player is detected by the human body detection camera or the like even though the IC card 1500 remains at the time of the settlement of the credit, the IC card 1500 can also be configured to be stored in the card stacker 1742. Accordingly, for example, when the IC card 1500 is left behind and the player leaves his or her seat in a state where the player knows that the remaining credit is low, and even when the player simply forgets to take the IC card 1500 and leaves his or her seat, the IC card 1500 does not remain retained in the card unit 1741 for a long time.

A USB terminal 1737 and an audio terminal 1738 are provided on an upper left side of the front surface of the panel 1710. The USB terminal 1737 is configured to perform charging or the like by connecting a USB device to the USB terminal 1737. The audio terminal 1738 is, for example, a four-pole terminal, and a headset is inserted thereinto, such that a user can talk to the other party with a headphone and a microphone. The audio terminal 1738 can be configured as a two-pole or a three-pole terminal such that the user also can listen to a voice with the headphone.

A touch unit 1745 is provided on the front surface of the panel 1710 and on the left side of the LCD 1719. The touch unit 1745 includes, as an information medium, a writer that writes data by data communication with respect to an IC device including an IC chip (for example, a non-contact IC card, and a mobile phone, a smart phone, or the like provided with a communication function by NFC); and a radio frequency identification (RFID) module that can function as a reader that reads the data from the IC device by the data communication. LEDs 1746 (not illustrated) are respectively disposed at four corners of a front surface of the touch unit 1745. In addition to the touch unit 1745, or in place of the touch unit 1745, an information recording medium reading device for reading information stored in an information recording medium such as a magnetic card may be provided. In this case, the magnetic card can be used as the member card instead of the IC card 1500.

As described above, in the SMIB device 1700 according to the embodiment of the present invention, various devices having a microphone function, a camera function, a speaker function, a display function, or the like are integrated to form one unit, thereby achieving space saving. Accordingly, for example, when the LCD is directed toward the player in a state where each of the functions is installed as a single part, there is no inconvenience that the speaker cannot be installed toward the player.

In the SMIB device 1700 according to the embodiment of the present invention, when the IC card 1500 is inserted into the card insertion slot 1730, the content of the IC card 1500 is configured to be read by the card unit 1741 and the entire IC card 1500 is configured to be taken in and retained (inside the SMIB device 1700). In addition thereto, the touch unit 1745 is provided, thereby making it possible to further perform the data communication with another IC card, the mobile phone, and the smart phone.

[Internal Configuration Provided in Slot Machine]

Figure 5:
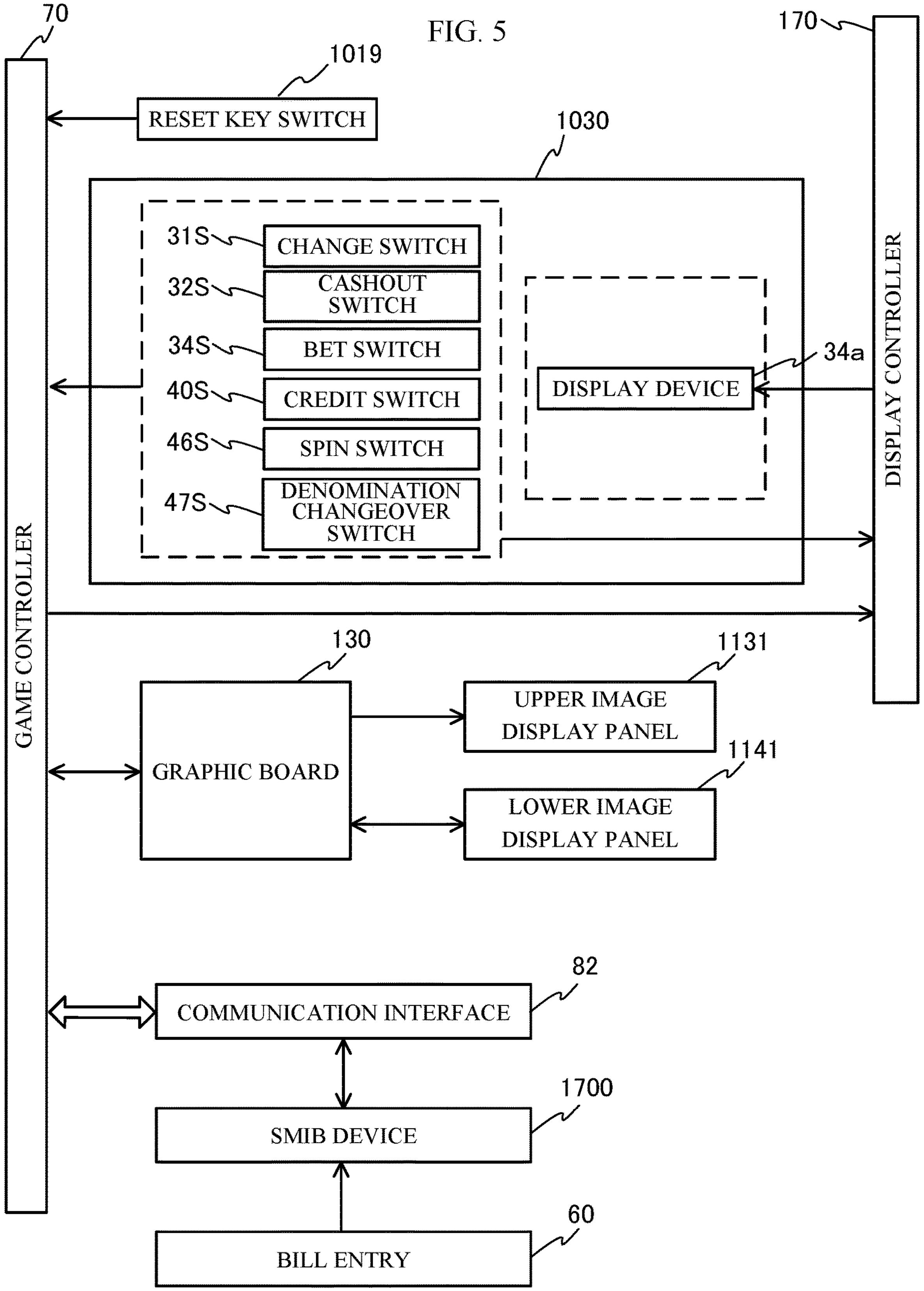
FIG. 5 is a block diagram illustrating an internal configuration of the slot machine according to the embodiment of the present invention.

Next, an internal configuration of the slot machine 1010 and the control panel 1030 provided in the slot machine 1010 will be described with reference to FIG. 5.

A game controller 70 is provided on a circuit substrate for a game inside the slot machine 1010. A display controller 170 is provided on a circuit substrate for a control panel different from the circuit substrate for the game of the game controller 70 inside the control panel. The game controller 70 and the display controller 170 respectively include: a central processing unit (CPU) provided on the circuit substrate for the game and the circuit substrate for the control panel; an electrically erasable and programmable read only memory (EEPROM) for storing programs executed by the CPU and data used for these programs in a rewritable manner; and a random access memory (RAM) for temporarily storing data when the program is executed. The game controller 70 and the display controller 170 are configured in cooperation with these hardware and software in the storage device described above. The display controller 170 is not limited to being provided separately from the game controller 70, and the game controller 70 may have the function of the display controller 170.

For example, the storage device of the game controller 70 stores the data and the programs used when the CPU operates. For example, when the above-described game program, a game system program, and an authentication program are taken in from an external storage device, the game controller 70 can store these programs. The storage device of the game controller 70 is provided with a work area used when the program is executed. For example, an area for storing the number of times of playing a game, the number of BETs, the number of payouts, the number of credits, or the like, and an area for storing symbols (code numbers) determined by lottery are provided.

As described above, the game controller 70 executes the game and controls the symbol display device 1016 so as to rearrange the symbols corresponding to the game. As described above, the game controller 70 validates a valid line of the number corresponding to a credit button (not illustrated) that receives an input in a display frame of three rows and five columns formed of a plurality of blocks, and when the same type of symbols of a predetermined number or more are rearranged in the validated valid line, a line dividend corresponding to the type of symbols is granted. That is, the game controller 70 is configured to control the slot machine by causing the CPU to execute the game program and the game system program in the storage device. The display controller 170 includes a graphic board and displays a BET amount required for a display device (not illustrated) of the credit button.

The control panel 1030 includes a CHANGE switch 31S, a CASHOUT switch 32S, a BET switch 34S, a credit switch 40S, a spin switch 46S, and a denomination changeover switch 47S corresponding to the above-described respective buttons. Each switch detects that the corresponding button is pressed by a player and outputs a signal to the game controller 70 and the display controller 170. The game controller 70 controls the BET based on the signals from the respective switches. The display controller 170 transmits the signals from the respective switches to the game controller 70, and the game controller 70 determines, based on the signals, contents to be displayed on the display device provided with the button, and transmits a determination result to the display controller 170, such that the contents are displayed on the respective buttons.

The game controller 70 is connected to a graphic board 130, a power supply unit 81, and a communication interface 82 in addition to the speaker, the touch panel, or the like.

The graphic board 130 controls, based upon a control signal output from the game controller 70, the display of the images respectively performed by the upper image display panel 1131 and the lower image display panel 1141. The graphic board 130 includes a VDP for generating image data, a video RAM for storing the image data generated by the VDP, or the like.

The graphic board 130 includes the video display processor (VDP) for generating the image data based upon the control signal output from the game controller 70 and the video RAM for temporarily storing the image data generated by the VDP. The image data used when generating the image data by the VDP is stored in the game program of the storage device. The graphic board 130 has a function of outputting operation results of various touch icons provided on the lower image display panel 141 to the game controller 70.

The communication interface 82 is a unit for performing communication with the SMIB device 1700 and an external control device. When receiving an input signal from the bill entry 60, the SMIB device 1700 transmits input currency information in the input signal to the game controller 70 via the communication interface 82. When the IC card is inserted into the card insertion slot, the SMIB device 1700 transmits the balance information stored in the IC card to the game controller 70 via the communication interface 82. The SMIB device 1700 writes credit data to the IC card inserted into the card insertion slot based upon the control signal received from the game controller 70 via the communication interface 82.

The game controller 70 can transmit a signal to the display controller 170 by using a well-known communication protocol and communication connection. For example, the game controller 70 transmits, to the display controller 170, a signal indicating whether or not a current state is a reception permission state of various buttons.

In the game controller 70, credit data input by a player can be stored in, for example, an internal RAM, and the credit data can be input to a game play by a BET operation of the player. The credit data stored in the RAM increases or decreases depending on a result of the game.

When the player operates the CASHOUT button provided on the slot machine 1010 after the game, the game controller 70 transmits, to the SMIB device 1700, payout information including information representing a credit balance stored in the RAM at this time (information representing a payout amount).

The SMIB device 1700 receiving the payout information transmits the payout information to the management server 500, and stores the payout information in a member account (or a non-member account) in association with the player (a member or a non-member), thereby updating the member account.

In this manner, in a normal payout process, the credit balance is transmitted to the management server 500 as the payout information, and the member (or the non-member) account is updated.

On the other hand, as a result of a game of a gaming machine, when a prize amount exceeding a preset amount is generated, or when malfunction occurs in the gaming machine, an attendant inserts a predetermined key into the reset key switch 1019 of the slot machine 1010 and turns the predetermined key, such that the operation result is input to the game controller 70. The game controller 70 forcibly pays out the credit balance stored in the RAM of the game controller 70 at this time, and performs a process of erasing the forcibly paid out credit balance from the RAM.

When the reset key switch 1019 is operated, the credit balance is once stored in the RAM 1753 (FIG. 6) of the SMIB device 1700, and then the credit balance is transmitted to the management server 500 together with information identifying the player playing the game at this time. When a player inserts the member information card (the IC card 1500) into the gaming machine 1010 (the SMIB device 1700) and plays a game, member information read from the member information card is used as the information for identifying the player. This member information is read from the member information card (the IC card 1500) inserted into the card unit 1741 and stored in the RAM 1753.

[Internal Configuration of SMIB Device]

Figure 6:
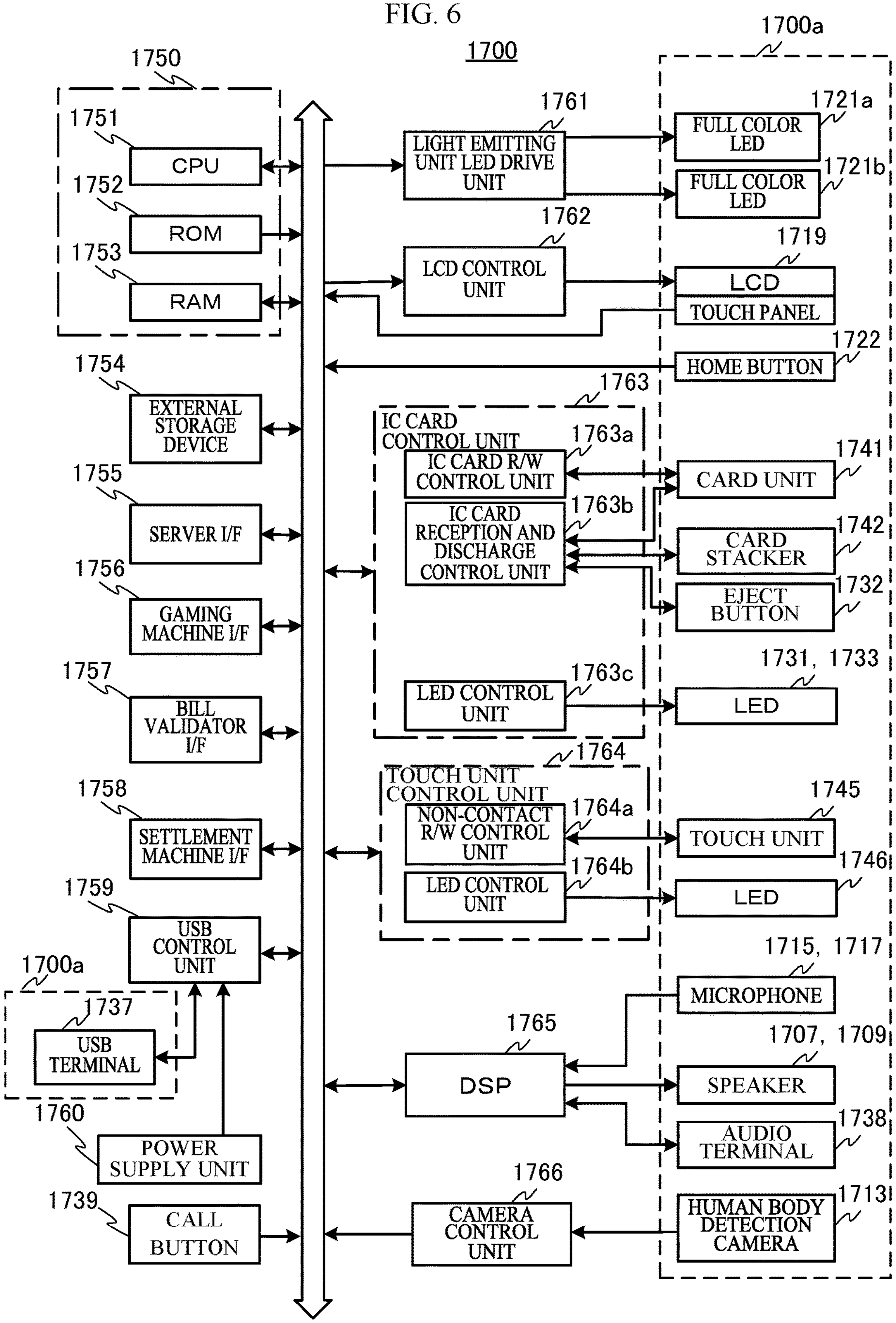
FIG. 6 is a block diagram illustrating a configuration of the SMIB device (the information processing device) according to the embodiment of the present invention.

Next, a configuration of a circuit provided in the SMIB device 1700 will be described with reference to FIG. 6. In FIG. 6, a structure unit 1700*a* of the SMIB device 1700 illustrated in FIG. 4 is shown by being surrounded by a broken line.

An SMIB controller 1750 that controls the SMIB device 1700 includes a CPU 1751, a ROM 1752, and a RAM 1753.

The CPU 1751 performs execution control of each component of the SMIB device 1700, and executes or computes various programs stored in the ROM 1752. For example, the CPU 1751 executes a credit update program to update credit related data stored in the IC card 1500.

The ROM 1752 is formed of a memory device such as a flash memory or the like, and stores permanent data to be executed by the CPU 1751. For example, the ROM 1752 stores the credit update program that rewrites the credit related data stored in the IC card 1500, an interlocking performance control program to be executed in response to a request from a bonus server (not illustrated), and a program to be executed in response to a request from the management server 500.

The RAM 1753 temporarily stores data necessary when various programs stored in the ROM 1752 are executed.

An external storage device 1754 is, for example, a storage device such as a hard disk device, and stores a program to be executed by the CPU 1751 and data used by the program to be executed by the CPU 1751.

A server interface (I/F) 1755 implements data communication between a server such as the management server 500 or the like and the SMIB device 1700. A gaming machine interface (I/F) 1756 implements data communication between the game controller 70 of the slot machine 1010 and the SMIB device 1700, and a prescribed protocol may be used for the data communication therebetween.

The SMIB device 1700 is connected to the bill entry 60 via a bill validator interface (I/F) 1757 and connected to a settlement machine (not illustrated) via a settlement machine interface (I/F) 1758, and can transmit and receive data as necessary.

A USB control unit 1759 determines whether to supply power from a power supply unit 1760 to the USB terminal 1737 and can charge the USB terminal 1737 when a predetermined condition is satisfied. A player can charge an electronic device by connecting the electronic device to the USB terminal 1737 when the predetermined condition is satisfied.

In order to cause a light emitting plate 1720*a* on an upper side of the LCD 1719 to emit light in response to a report request from the management server 500, an interlocking performance start request from the bonus server (not illustrated), or the like, a light emitting unit LED drive unit 1761 controls the full color LED 1721*a* to be turned on at a predetermined timing, and in order to cause a light emitting plate on a lower side of the LCD 1719 to emit light, the light emitting unit LED drive unit 1761 controls the full color LED 1721*b* to be turned on at a predetermined timing.

An LCD control unit 1762 performs control so that information contributing to a fraudulent behavior such as money laundering, member information, information for a member, or the like are displayed on the LCD 1719, and data read from the IC card 1500 and data input by a player are displayed. The LCD 1719 has a touch panel function, and when the touch panel is operated by the player, a predetermined signal is transmitted to the CPU 1751.

A home button 1722 is provided near the LCD 1719 and is a button for shifting a screen displayed on the LCD 1719 to a predetermined higher-level screen. When the home button 1722 is pressed by a player, an operation of the player is transmitted to the CPU 1751, and the CPU 1751 transmits a command to the LCD control unit 1762 so as to update the display of the LCD 1719 in response to the operation.

An IC card control unit 1763 controls insertion and discharge of the IC card 1500, and writing of the credit data. The IC card control unit 1763 includes an IC card reader and writer (R/W) control unit 1763*a*, an IC card reception and discharge control unit 1763*b*, and an LED control unit 1763*c*. The IC card 1500 can use a so-called contact type card including a module terminal that makes contact with the IC card reader and writer (R/W), and a so-called non-contact type card including an antenna that transmits and receives information in a non-contact manner with the IC card reader and writer (R/W). The IC card reader and writer (R/W) can also adopt a configuration corresponding thereto.

The IC card R/W control unit 1763*a* controls the card unit 1741, thereby updating credit related data (game value information) stored in the IC card 1500. When the IC card 1500 is newly issued, the credit related data corresponding to a settled amount is stored therein. The card unit 1741 includes an antenna unit for reading or writing data from or to the IC card 1500 by NFC or the like.

The card unit 1741 has a function of an IC card reader for reading the information stored in the IC card 1500 and a function of an IC card writer for writing the information to the IC card 1500, and may have any one of the above-described functions as necessary.

The IC card reception and discharge control unit 1763*b* controls reception and discharge of the IC card 1500. When the IC card 1500 is inserted into the card insertion slot 1730 by a player, the IC card is controlled to be retained in the card unit 1741 while the player executes a game. After the credit related data is written to the IC card 1500 at the time of settlement, the IC card 1500 is controlled to be discharged therefrom. When the eject button 1732 is pressed, the IC card 1500 is also discharged.

When the IC card 1500 is newly issued, the IC card 1500 is newly taken out of the card stacker 1742, and then the IC card 1500 is supplied to the card unit 1741 in order to store the credit related data.

The LED control unit 1763*c* performs control so that the LED (the full color LED 1731) provided near the card insertion slot 1730 of the card unit 1741 is turned on and the LED (the red LED 1733) provided near the eject button 1732 is turned on.

A touch unit control unit 1764 controls data transmission and reception associated with a touch operation of the IC card 1500, a mobile phone, a smart phone, or the like. The touch unit control unit 1764 includes a non-contact reader and writer (R/W) control unit 1764*a* and an LED control unit 1764*b*.

The non-contact R/W control unit 1764*a* determines whether the IC card 1500 and the mobile phone approaches a predetermined distance (for example, a touch operation is performed) with the touch unit 1745, and when the IC card 1500 and the mobile phone approaches the predetermined distance, the non-contact R/W control unit 1764*a* acquires a reading result or the like from the touch unit 1745. The touch unit 1745 includes an antenna unit for transmitting and receiving data to and from the IC card 1500 and the mobile phone by NFC or the like.

The touch unit 1745 has a function of an IC card reader for reading information stored in the IC card 1500 and the mobile phone, and a function of an IC card writer for writing information to the IC card 1500 and the mobile phone, and may have any one of the above-described functions as necessary.

The LED control unit 1764*b* controls the LEDs 1746 disposed at four corners of the front surface of the touch unit 1745 and lights the LEDs 1746 at a predetermined timing.

A DSP 1765 receives voice data acquired from microphones 1715 and 1717, performs a predetermined voice process thereon, and transmits the processed voice data to the CPU 1751. The DSP 1765 transmits the received voice data to speakers 1707 and 1709. The DSP 1765 further outputs the received voice to a headphone with respect to an audio terminal connected to a headset, processes the voice received from the microphone, and transmits the processed voice to the CPU 1751. Here, a schematic configuration is illustrated, and illustration of an A/D converter, a D/A converter, an amplifier, or the like is omitted.

A camera control unit 1766 acquires an image of a player or the like captured by the human body detection camera 1713, performs a predetermined image process as necessary, and transmits the processed data to the CPU 1751. The data is transmitted to, for example, the management server 500, a member management server 13, or the like via the server I/F 1755.

The camera control unit 1766 transmits image capturing information captured by the human body detection camera 1713 to the management server 500 or the like in response to an instruction from the management server 500.

[Hand Pay Process]

Figure 7:
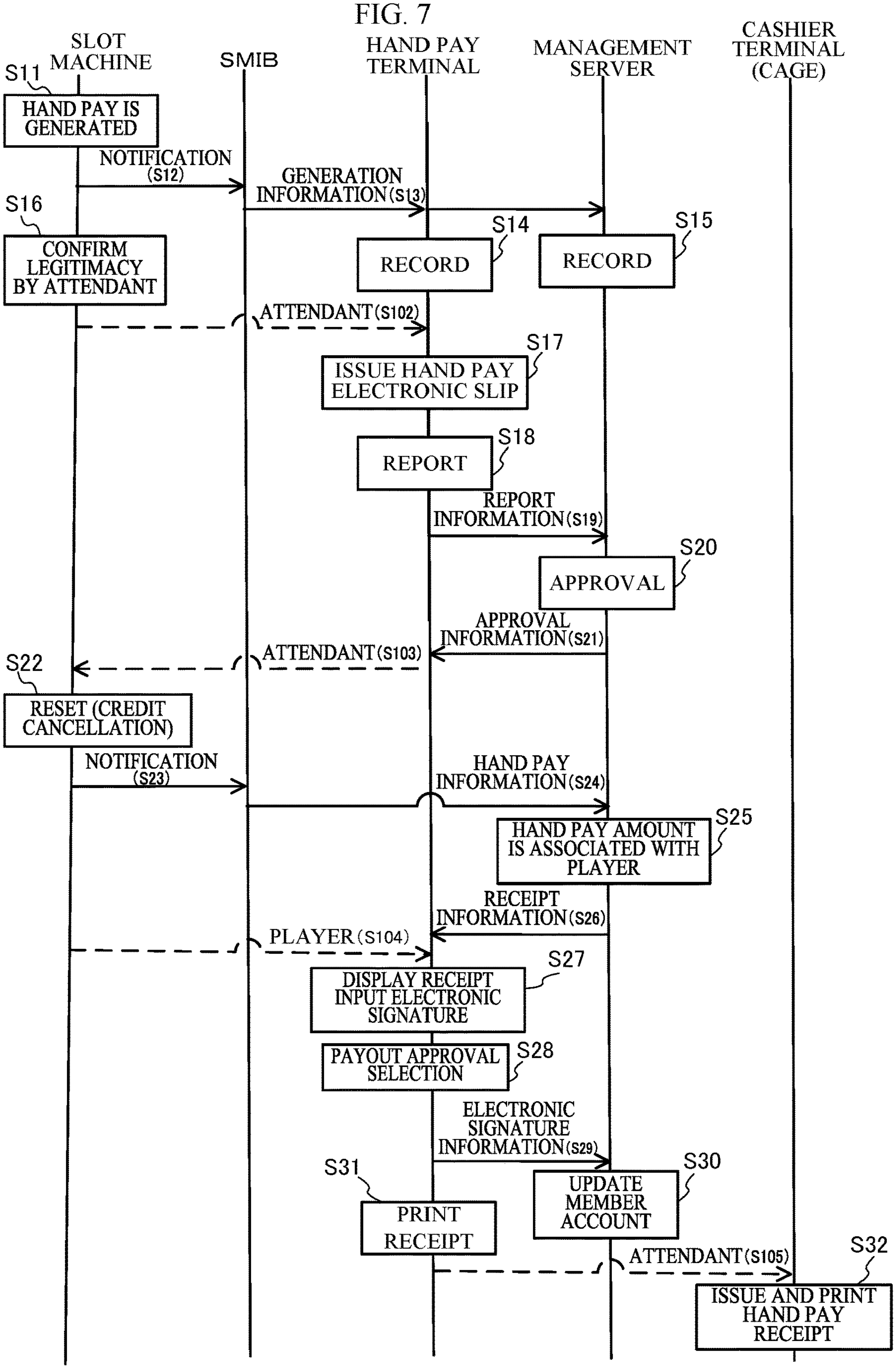
FIG. 7 is flowchart illustrating a payout process when a hand pay is generated according to an embodiment of the present invention.

The hand pay process in the casino system 100 will be described with reference to FIG. 7.

Figure 8:
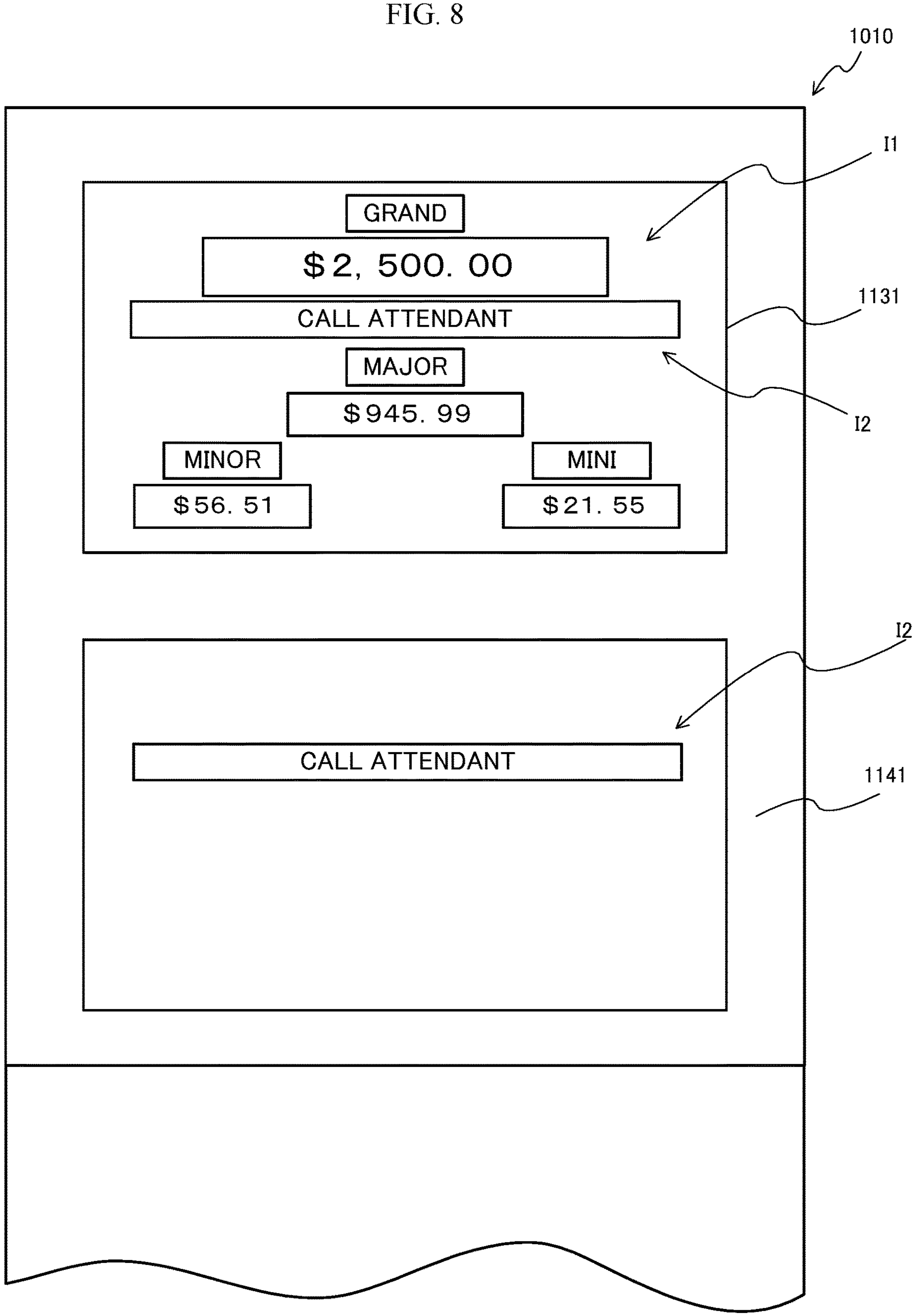
FIG. 8 is a schematic diagram illustrating a display example in the slot machine when the hand pay is generated according to the embodiment of the present invention.

First, when a prize of a predetermined amount or more such as a jackpot or the like is generated in the slot machine 1010 (S11), the slot machine 1010 causes a display unit thereof (for example, the upper image display panel 1131 and the lower image display panel 1141) to perform a display for urging an attendant to be called (S12). A display example in this case is illustrated in FIG. 8. As illustrated in FIG. 8, a prize amount Il is displayed on the upper image display panel 1131, and the upper image display panel 1131 and the lower image display panel 1141 include a display 12 formed of characters or the like that urges the attendant to be called.

At this time, the slot machine 1010 notifies the SMIB device 1700 that a hand pay is generated (S12). The SMIB device 1700 receiving the notification transmits, to the hand pay terminal device 600 and the management server 500, hand pay generation information including a generation cause of the hand pay (for example, a prize of a predetermined amount or more is generated), identification information of the slot machine 1010, and member information of a player playing a game in the slot machine 1010 at this time (S13). When a member player plays a game on the slot machine 1010, the member information card is inserted into the card insertion slot 1730 (FIG. 4) of the slot machine 1010 (the SMIB device 1700), and the slot machine 1010 (the SMIB device 1700) reads member information of the player recorded on the inserted member information card, such that the hand pay generation information can include the member information of the member who is playing the game.

The hand pay terminal device 600 and the management server 500 store the received hand pay generation information (S14 and S15).

When the player calls an attendant in response to the display of the slot machine 1010, the attendant goes to the slot machine 1010 and confirms the generation cause of the hand pay. For example, when a prize of a predetermined amount or more is generated, the attendant confirms legitimacy of the generation of the hand pay by confirming a stop mode (a symbol arrangement state) of the pseudo reels 1151 to 1155 of the slot machine 1010 (S16).

When the legitimacy thereof is confirmed, the attendant moves from the slot machine 1010 to the hand pay terminal device 600 (S102), and issues a hand pay electronic slip by operating the hand pay terminal device 600 (S17). In this case, the hand pay terminal device 600 already receives the hand pay generation information (S13) from the SMIB device 1700 of the slot machine 1010, such that the hand pay electronic slip can be displayed on the display device of the hand pay terminal device 600 based on amount information in the hand pay generation information (S13).

Specifically, when the identification information (for example, a unit number) of the slot machine 1010 in which the hand pay is generated is input to the hand pay terminal device 600, the hand pay terminal device 600 reads out the hand pay generation information (S13) received from the slot machine 1010 corresponding to the input identification information, and displays the electronic slip displaying the amount on the display device based on the generation information. At this time, the hand pay terminal device 600 assigns an electronic slip number unique to the electronic slip and issues an electronic slip associated with the number. The member information in the hand pay generation information (S13) is associated with this electronic slip. After confirming contents of the displayed electronic slip, the attendant performs a report process S18 to a manager by operating the hand pay terminal device 600. In the embodiment, the generation information (S13) transmitted from the SMIB device 1700 to the hand pay terminal device 600 includes the credit balance of the slot machine 1010 in which the hand pay is generated and the amount paid to the player by the hand pay process (the hand pay amount). Alternatively, the generation information (S13) may not include the hand pay amount. In this case, when issuing the hand pay electronic slip in the hand pay terminal device 600 (S17), the attendant may visually check the credit balance of the slot machine 1010 and input the credit balance thereof into the hand pay terminal device 600.

In the report process S18, when the attendant operates the hand pay terminal device 600 and inputs a report instruction, the hand pay terminal device 600 transmits report information to the management server 500 (S19). This report information includes the identification information of the slot machine 1010 in which the hand pay is generated, the member information of the player playing the game in the slot machine 1010 when the hand pay is generated, the hand pay amount, and the electronic slip number. These pieces of information are transmitted from the SMIB device 1700 to the hand pay terminal device 600 as the generation information (S13) when the hand pay is generated.

When the management server 500 receives the report information (S13), an administrator (a manager) confirms report contents and performs an approval process (S20). In this approval process (S20), the administrator determines legitimacy of the report information (S19) based on the hand pay generation information (S13 and S15) recorded at the time of receiving the hand pay generation information (S13) and the report information (S19) transmitted from the hand pay terminal device 600 by the attendant, and when the report contents match, the administrator determines that the report information is legitimate and performs approval thereof. The approved report information (S19) is recorded in the management server 500 as approved information together with the already received generation information (S13). When the approval process (S20) is performed in this manner, approval information (S21) is transmitted from the management server 500 to the hand pay terminal device 600.

When confirming an approval result on the display device of the hand pay terminal device 600, the attendant moves to the slot machine 1010 in which the hand pay is generated (S103), and operates the reset key switch 1019 of the slot machine 1010 to reset credit amount data stored in the game controller 70 of the slot machine 1010 (S22). When a credit cancellation process is performed by operating the reset key switch 1019, the slot machine 1010 notifies the SMIB device 1700 of the credit cancellation process and a cancellation amount (a credit balance when the reset key switch 1019 is operated) as erasure information (S23). The SMIB device 1700 receiving the notification from the slot machine 1010 transmits, to the management server 500, hand pay information S24 including the cancellation amount, the identification number of the slot machine 1010 on which the reset key switch 1019 is operated, the member information of the player playing the game in the slot machine 1010 at this time (the member information read from the member information card being inserted into the card insertion slot 1730 (FIG. 4)).

The management server 500 receiving the hand pay information (S24) from the SMIB device 1700 compares the hand pay amount in the hand pay information S24 and the member information of the player with the approved information recorded in the approval process (S20), and determines legitimacy thereof, and when determining that the comparison therebetween is legitimate, the management server 500 updates the credit data of the member account by temporarily adding the hand pay amount to the member account. That is, by this update process, the hand pay amount and the player (the member) are temporarily associated with each other (S25). The temporary association indicates that since there is no evidence showing that the player receives the hand pay amount until the player inputs an electronic signature to a receipt, which will be described later, the temporary association is performed until then.

When the management server 500 completes the association between the hand pay information and the player (the member), the management server 500 generates receipt data relating to the hand pay of which association is completed at this time, and transmits the receipt data to the hand pay terminal device 600 as receipt information (S26). This receipt information is data in which pieces of information such as the hand pay amount, member information (a name and a membership number), or the like are described in a receipt form.

The hand pay terminal device 600 receiving the receipt information (S26) displays the receipt including the hand pay amount on a display device provided in the hand pay terminal device 600, and urges the player to perform an electronic signature on this receipt display (S27). The electronic signature is a signature that is input by the hand on an input panel and then the handwritten signature is converted into data and stored.

The player moves from the slot machine 1010 to the hand pay terminal device 600 according to an instruction of the attendant (S104), and when the player performs the electric signature on the hand pay terminal device 600, the hand pay terminal device 600 continuously displays a screen for selecting a method for receiving the hand pay amount on the display device, and urges the player to select the method for receiving the hand pay amount (S28). A first selection method is a cashless process that only performs the process (S24 and S25 described above) of transmitting credit data equivalent to the hand pay amount to the member account of the player (the member) opened in the management server 500, and of adding the credit data equivalent to the hand pay amount to the member account of the player, and a second selection method is a cash process in which the hand pay amount is paid out in cash.

When the method for receiving the hand pay amount is selected, the hand pay terminal device 600 transmits, to the management server 500, electronic signature information including input electronic signature data, an electronic slip number corresponding thereto, and information on specifying the receiving method (S29). The management server 500 receiving the electronic signature information officially updates the member account specified by the member information in the electronic signature information (S30). Specifically, when the cashless process, which is the first selection method, is selected, the member account of which temporary association is performed for the hand pay amount in step S25 is officially updated so as to become the balance in which the hand pay amount is added. On the other hand, when the cash payment (the cash process), which is the second selection method, is selected, the update process of the member account is performed by subtracting the hand pay amount temporarily added to the member account.

When the player selects the cash process which is the second selection method, the hand pay terminal device 600 prints a hand pay receipt in which the hand pay amount or the like is described by a barcode (S31). When the hand pay receipt is printed, the attendant takes the hand pay receipt to the cage (the cashier terminal device 400) (S105) and receives cash and a receipt in exchange for the hand pay receipt (S32). Specifically, in the cage (the cashier terminal device 400), when the hand pay receipt is received from the attendant, a pair of receipts (a receipt for an attendant signature and a receipt for a player signature) are issued, and these receipts are handed over to the attendant. The attendant fills in his or her (the attendant) signature on the receipt for the attendant signature and returns the signed receipt to the cage. The cage receiving the receipt on which the attendant signature is written hands over cash corresponding to a face value (the hand pay amount) of the receipt in exchange for the receipt for the attendant signature to the attendant.

The attendant gives the player the receipt for the player signature, and the player fills in his or her signature on the receipt and returns the signed receipt to the attendant. The attendant gives the cash to the player in exchange for the receipt on which the player signature is written and returns the receipt to the cage. The cage keeps the receipt on which the attendant signature is written and the receipt on which the player signature is written. When the player wishes to receive a copy of the receipt on which the player signature is written, the copy of the receipt is given to the player.

As described above, in the hand pay process of the embodiment, when the hand pay is generated in the slot machine 1010, the information on the cancellation amount of the slot machine 1010 is stored in the member account of the management server 500, that as the hand pay process when the hand pay is generated, the cashless process can be performed without actually handing cash over to the player.

Processing time required for the hand pay process can be shortened by making it possible to perform the hand pay process without cash in this manner. It is also possible to prevent occurrence of a human error by eliminating cash receipts and payments. It becomes unnecessary that cash is handed over to an attendant in the cage and the attendant hands cash over to the player as in related art, thereby making it possible to provide a system in which it is difficult for the attendant to perform a fraudulent behavior related to the handling of cash. Since the player can transmit the amount of money related to the hand pay to the member account simply by checking the face value of the receipt displayed on the display device of the hand pay terminal device 600 and filling in the electronic signature, the player can receive the amount of money related to the hand pay without a troublesome labor of manually counting the amount of cash as in related art.

Figure 9:
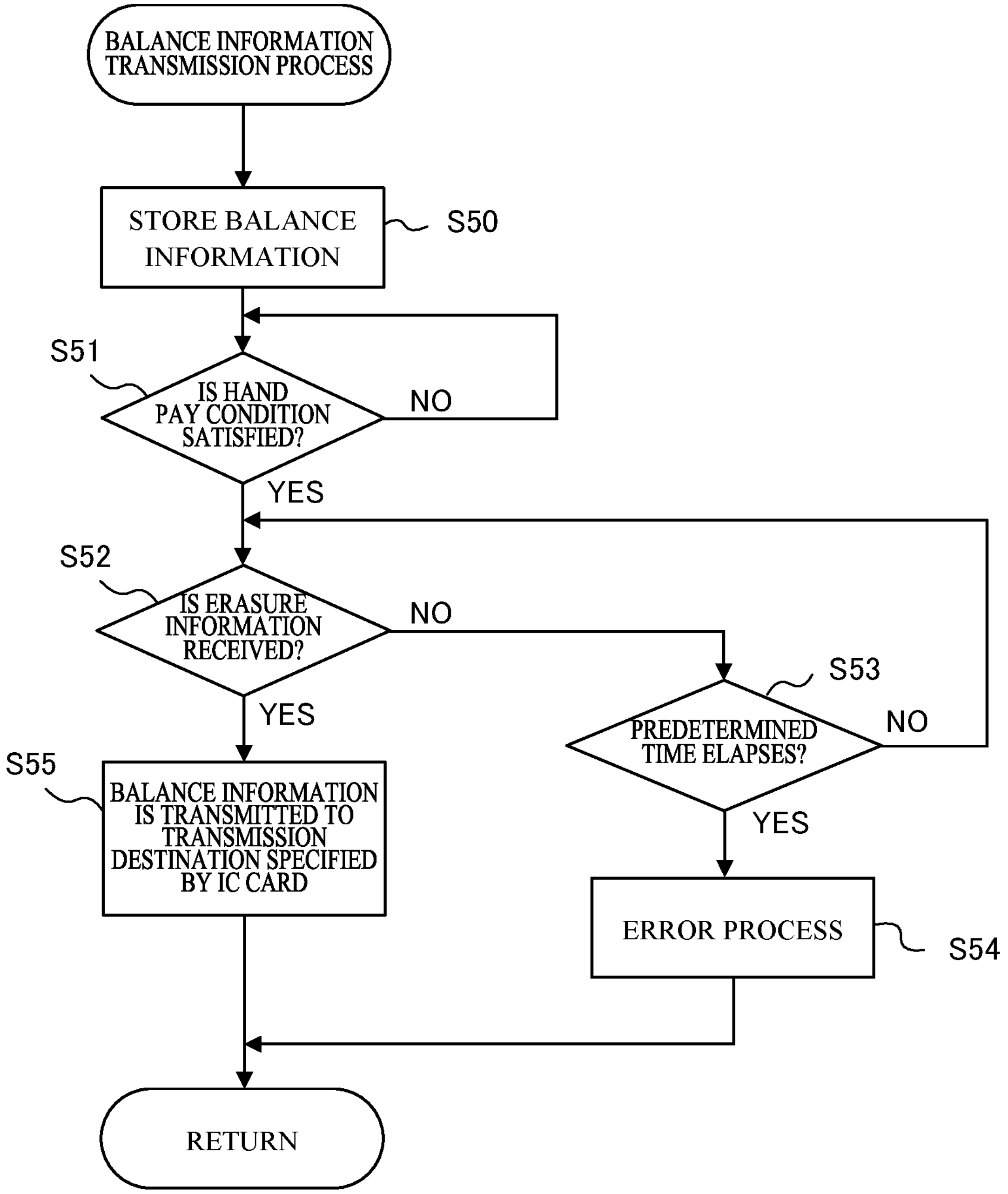
FIG. 9 is a flowchart illustrating a balance transmission process by the SMIB device.

FIG. 9 is a flowchart illustrating a process (a credit balance transmission process) in which the reset key switch 1019 is operated from the process (S11) when the hand pay is generated (S22) among the processes of the SMIB device in FIG. 8, and credit balance information adds the credit data corresponding to the hand pay amount to the member account of the player of the management server 500 from the SMIB device 1700.

In this process, the SMIB device 1700 stores credit balance information transmitted from the slot machine 1010 in the RAM 1753 (FIG. 6) in association with member information (information acquired from a member information card) of a player who is playing a game at this time (S50). When a hand pay is validated in the slot machine 1010, this process may be performed by any one of a method in which the credit balance information stored in the game controller 70 of the slot machine 1010 is transmitted from the slot machine 1010 to the SMIB device 1700, and an update method in which every time a credit balance is updated as the game progresses in the slot machine 1010, the updated credit balance is transmitted from the slot machine 1010 to the SMIB device 1700, and stored in the RAM 1753 of the SMIB device 1700.

Next, in step S51, the SMIB device 1700 determines whether or not a hand pay condition is satisfied in the slot machine 1010. When the hand pay is validated in the slot machine 1010, the notification (S12) is transmitted from the slot machine 1010 to the SMIB device 1700, thereby making it possible to recognize that the hand pay is validated in the SMIB device 1700.

The SMIB device 1700 repeats the process of step S51 until receiving the notification from the slot machine 1010 that the hand pay is validated. When receiving the notification indicating that the hand pay is validated, the SMIB device 1700 obtains a positive result in step S51, shifts the process from step S51 to step S52, and determines whether or not erasure information is received from the slot machine 1010.

The erasure information is information transmitted to the SMIB device 1700 under the control of the game controller 70 when an attendant operates the reset key switch 1019 in the slot machine 1010 and the credit cancellation process is performed (S23 (FIG. 8)).

When the SMIB device 1700 determines that the erasure information is not received, the SMIB device 1700 obtains a negative result in step S52, shifts the process from step S52 to step S53, and determines whether or not a predetermined time elapses. When receiving the notification from the slot machine 1010 indicating that the hand pay condition is satisfied (S51: YES), the SMIB device 1700 starts an internal timer and measures an elapsed time from the start time. When a preset processing time does not elapse, the SMIB device 1700 obtains a negative result in step S53, shifts the process from step S53 to step S52 described above, and repeats the same process.

On the other hand, when the positive result is obtained in step S53, this indicates that the SMIB device 1700 does not receive the erasure information from the slot machine 1010 even after a predetermined time elapses after receiving the information indicating that the hand pay is validated from the slot machine 1010, such that the SMIB device 1700 shifts the process from step S53 to step S54 and executes an error process to display that an error occurs on the LCD 1719 of the SMIB device 1700 and to transmit error occurrence information to the management server 500.

On the other hand, when the positive result is obtained in step S52, this indicates that the SMIB device 1700 receives the erasure information from the slot machine 1010 within a predetermined time after the hand pay is validated in the slot machine 1010, that is, this indicates that the attendant operates the reset key switch 1019 of the slot machine 1010, such that the SMIB device 1700 shifts the process from step S52 to step S55, and transmits the hand pay information S24 (FIG. 8) including a hand pay amount representing a credit balance at this time to the member account on the management server 500 specified by the member information obtained from the IC card 1500 being inserted into the card unit 1741 at this time (FIG. 6).

Accordingly, in the member account opened in the management server 500, the credit balance (the hand pay amount) of the player in the slot machine 1010 when the reset key switch 1019 of the slot machine 1010 is operated and the credit cancellation process is performed is transmitted to the member account of the management server 500. That is, the credit balance (the hand pay amount) is paid out to the player by a method of transmitting data representing the amount of money by a process (a process by the SMIB device 1700) different from the payout process in the slot machine 1010.

While the above-described embodiment describes a case in which the hand pay terminal device 600 is installed at a fixed position in a casino hall, the embodiment is not limited thereto and may use a portable terminal device as the hand pay terminal device 600. In this case, when a hand pay is generated, an attendant takes a portable hand pay terminal device and goes to the slot machine 1010, such that the process of issuing the electronic slip (S17) and the process of causing a player to input an electronic signature into the hand pay terminal device (S27) can be performed while the attendant and the player are in the slot machine 1010. That is, the hand pay process can be performed more smoothly.

While the above-described embodiment describes a case in which the hand pay process is performed when a prize of a predetermined amount or more such as a jackpot or the like is generated, the embodiment is not limited thereto. For example, even when inconvenience occurs in the slot machine 1010, the same process as the hand pay process according to the embodiment can be performed. Accordingly, for example, even when the credit data stored in the slot machine 1010 cannot be paid out due to the inconvenience of the slot machine 1010, the credit data remaining in the slot machine 1010 can be manually paid out to the player by the hand pay process together with the operation of the reset key switch 1019, such that cashless and smooth process can be performed by executing the process of the embodiment as this hand pay process.

While the above-described embodiment describes a case in which the hand pay amount is officially associated with the member account of the management server 500 when the player inputs the electronic signature in the hand pay terminal device 600, the embodiment is not limited thereto. When the attendant operates the reset key switch 1019 of the slot machine 1010 (S22), the player and the hand pay amount may be immediately associated with each other.

While the above-described embodiment describes a case in which the player inputs the electronic signature via the hand pay terminal device 600 after the reset key switch 1019 is operated (S22), the embodiment is not limited thereto. The operation of the reset key switch 1019 may be performed (the operation becomes possible) after the player inputs the electronic signature.

While the above-described embodiment describes a case in which the IC card 1500, which is a card-shaped medium, is used as the member information card associated with the member information or the non-member information card used by the non-member, the embodiment is not limited thereto. For example, various other portable information media such as a portable terminal device or the like can be widely applied. When the portable terminal device is used, instead of the IC card control unit 1763 (FIG. 6), the SMIB device 1700 may include an RFID module for performing, for example, near field communication with the portable terminal device.

While the above-described embodiment describes a case in which the player inputs the electronic signature in the hand pay terminal device 600 (FIG. 7), instead of the electronic signature, for example, the player can operate a predetermined confirmation input button of the hand pay terminal device 600, that is, the point is that various other configurations can be used as long as a result confirmed by the player can be input.

While the embodiments of the present invention are described above, the embodiments only describe specific examples and do not particularly limit the present invention, and a specific configuration of each unit or the like can be appropriately modified. The effects described in the embodiments of the present invention are only a list of the most desirable effects obtained from the present invention, and the effects of the present invention are not limited to those described in the embodiments of the present invention.

In the above-described detailed descriptions, a characteristic part is mainly described so as to more easily understand the present invention. The present invention is not limited to the embodiments described in the detailed descriptions, but can be also applied to other embodiments and the scope of application thereof is varied. The terminology and the phase used in the present specification are used to accurately describe the present invention, and are not used to limit the interpretation of the present invention. It may be easy for those skilled in the art to reconsider other configurations, systems, methods, or the like in the concept of the present invention from the concept of the present invention described in the present specification. Therefore, the description of the scope of the claims shall be deemed to include an equivalent configuration without departing from the scope of the technical ideas of the present invention. An object of the abstract is to enable the patent office, a general public institution, and an engineer belonging to the technical field who is not familiar with patents, legal terms, or technical terms to quickly determine the technical content of the present application and nature thereof with a simple investigation. Therefore, the abstract is not intended to limit the scope of the invention to be evaluated by the descriptions of the scope of the claims. In order to fully understand the object of the present invention and the specific effect thereof, it is desirable that the pieces of literature already disclosed are interpreted with due consideration.

The above-described detailed descriptions include a process executed by a computer. The above descriptions and expressions are intended to help those skilled in the art to understand most efficiently. In the present specification, each step used to derive one result should be understood as a process that is not self-contradictory. In each step, transmission and reception, recording, or the like of an electrical or magnetic signal are performed. In the process in each step, while such a signal is represented with bits, values, symbols, characters, terms, numbers, or the like, it should be noted that these are only used for the convenience of the descriptions. While the process in each step may be described with expressions common to a human behavior, the process described in the present specification is basically performed by various devices. Other configurations required for performing each step become obvious from the above descriptions.

REFERENCE SIGNS LIST

100: casino system
500: management server
400: cashier terminal device
600: hand pay terminal device
1010A, 1010B: slot machine
1019: reset key switch
1500: IC card
1700: SMIB device

The invention claimed is:

1. A payout management system that performs a payout operation comprising:

a gaming machine that executes a game according to an input game value and stores a balance of the game value;

an interface board device; and, at least one external computer;

wherein, the interface board device is in communication with the gaming machine and the at least one external computer, and the interface board device transmits information to and from the gaming machine and to and from the at least one external computer;

wherein, when a prize of a predetermined amount or more is generated at the gaming machine, the gaming machine:

displays prize information and hand pay information;

transmits the prize information and the hand pay information to the interface board device; and, displays information corresponding to the need to call an attendant;

wherein, when the interface board device receives the prize information and the hand pay information from the gaming machine, the interface board device transmits the prize information and the hand pay information to a hand pay terminal and to a management server, each of which store the hand pay information;

wherein, upon calling the attendant and confirming the legitimacy of the prize information and hand pay information, generating a hand pay slip and report information at the hand pay terminal, the hand pay terminal transmitting the report information to the management server;

wherein, upon receiving the report information and confirming the legitimacy thereof, the management server transmits approval information to the hand pay terminal;

wherein, upon receiving the approval information at the hand pay terminal, resetting credit amount information stored at the gaming machine having displayed the prize information and hand pay information;

wherein, upon resetting the credit amount information stored at the gaming machine having displayed the prize information and hand pay information, transmitting erasure information from the gaming machine to the interface board device;

wherein, upon receiving the erasure information, the interface board device transmits the erasure information to the management server;

wherein, upon receiving the erasure information, the management server compares the erasure information with the stored hand pay information, generates receipt data and transmits the receipt information to the hand pay terminal;

wherein, upon receiving the receipt information at the hand pay terminal, displaying the receipt information and one or more payment options on the hand pay terminal;

receiving a selection of the one of more payment options and an electronic signature verifying a hand pay payout at the hand pay terminal; and, upon receiving the selection of the one of more payment options and the electronic signature verifying the hand pay payout at the hand pay terminal, transmitting information relating to the hand pay payout to the management server.

2. The payout management system according to claim 1, wherein, the interface board device includes one or more of a slot, a port, or a communications interface that receives one or more of a non-transitory computer readable storage medium therein and/or electronic data corresponding to game player information and/or game player balance information; and, wherein, the interface board device transmits the game player information and/or the game player balance information to an account associated with a game player stored at the management server.

3. The payout management system of claim 2, wherein, upon receiving the erasure information including the prize information and the hand pay information from the gaming machine at the interface board device, the interface board device transmits the prize information and the hand pay information to the management server, and the management server associates the prize information and the hand pay information with the account associated with the game player stored at the management server.

4. The payout management system of claim 1, wherein, upon associating the prize information and the hand pay information with the account associated with the game player:

transmitting the receipt information to the hand pay terminal, displaying the receipt information and the one or more payment options at the hand pay terminal; and receiving the selection of the one of more payment options and the electronic signature of the game player verifying the hand pay payout at the hand pay terminal, the hand pay payout comprising one or more of a credit applied to one or more accounts associated with the game player, the issuance of a payout slip or a card, the transmission of data to an electronic device, or a cash payout.

5. The payout management system of claim 1, wherein the one or more accounts includes the account associated with the game player and stored at the management server.

6. The payout management system of claim 1, wherein the electronic device includes one or more of a non-contact IC card, a mobile device, or a smartphone.

7. The payout management system of claim 1, wherein the hand pay terminal is a portable communications device.

8. The payout management system of claim 1, wherein the interface board device comprises a slot machine interface board (SMIB) device.

9. The payout management system of claim 1, wherein the interface board device comprises a slot machine interface board (SMIB) device including at least one slot that receives one or more of a bill, a card, a coin, or a token.

* * * * *